(12) United States Patent
Persson

(10) Patent No.: US 6,796,016 B2
(45) Date of Patent: Sep. 28, 2004

(54) INJECTION MOULD AND METHOD FOR MAKING THE SAME

(75) Inventor: Lars Persson, Kristianstad (SE)

(73) Assignee: Nolato AB, Torekov (SE)

( * ) Notice: Subject to any disclaimer, the term of this patent is extended or adjusted under 35 U.S.C. 154(b) by 0 days.

(21) Appl. No.: 10/036,409

(22) Filed: Jan. 7, 2002

(65) Prior Publication Data

US 2003/0068401 A1 Apr. 10, 2003

(30) Foreign Application Priority Data

Oct. 10, 2001 (SE) .............................................. 0103385

(51) Int. Cl.[7] .............................................. B23P 13/04
(52) U.S. Cl. ............................ 29/558; 29/701; 29/703; 264/645; 264/225; 425/162; 425/175
(58) Field of Search .......................... 29/558, 701, 703; 264/645, 219, 328.1, 239; 425/162, 175, 176, 558, 421, 443

(56) References Cited

U.S. PATENT DOCUMENTS

| | | | | |
|---|---|---|---|---|
| 4,416,604 A | * | 11/1983 | Bender et al. | 425/183 |
| 4,473,346 A | * | 9/1984 | Hehl | 425/183 |
| 4,500,274 A | * | 2/1985 | Cyriax et al. | 425/185 |
| 4,795,125 A | * | 1/1989 | Boros et al. | 249/78 |
| 5,062,052 A | * | 10/1991 | Sparer et al. | 700/197 |
| 5,147,663 A |  | 9/1992 | Trakas | |
| 5,216,617 A | * | 6/1993 | Kamiguchi et al. | 700/201 |
| 5,316,707 A | * | 5/1994 | Stanciu et al. | 264/40.1 |
| 5,595,771 A | * | 1/1997 | Foltuz et al. | 425/443 |
| 5,824,249 A | * | 10/1998 | Leitch et al. | 264/219 |
| 6,079,971 A |  | 6/2000 | Ramond | |

FOREIGN PATENT DOCUMENTS

| WO | 01/66334 | 9/2001 |
|---|---|---|

* cited by examiner

*Primary Examiner*—David P. Bryant
*Assistant Examiner*—Stephen Kenny
(74) *Attorney, Agent, or Firm*—Burns, Doane, Swecker & Mathis, L.L.P.

(57) ABSTRACT

An injection mould which comprises at least five modules aligned with each other. The five modules correspond to a first mould module and a second mould module to form a product cavity, a drive module for driving of sliders, an engaging module adapted, by application of a force, to prevent dividing between the first and the second mould module when introducing product material into the product cavity, and an ejector module for ejecting a completed product from one of the first and the second mould module.

The method for making injection moulds comprises the steps of receiving a product pattern, defining function holes and function recesses, and defining, separate from and parallel to the construction of function holes and function recesses, a product cavity and the parting plane of the mould. Moreover the method comprises the step of mechanically machining a plurality of modules essentially simultaneously.

5 Claims, 12 Drawing Sheets

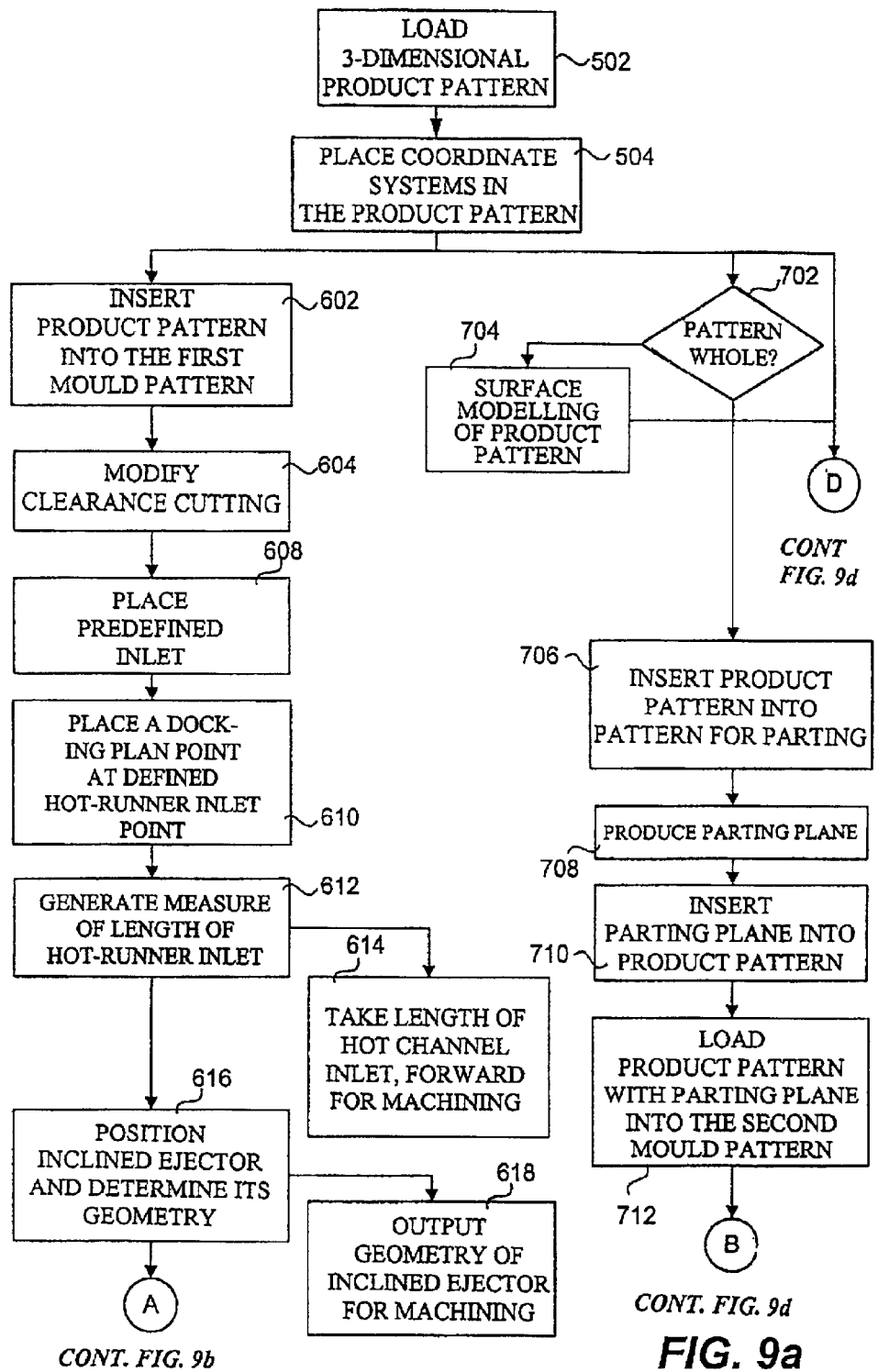

INJECTION MOULD AND METHOD FOR MAKING THE SAME

FIELD OF THE INVENTION

The present invention relates to an injection mould and methods for making the same.

BACKGROUND ART

It is time-consuming and expensive to design and make injection moulds. Usually a mould maker obtains a three-dimensional digital product pattern of the product. Then the mould maker adjusts the product pattern so as to obtain a mould pattern that can be used for making a product cavity by means of an NC machine. This adjustment of the product pattern is only necessary if the pattern has such deficiencies that it could not be used for making a product cavity by means of an NC machine, such deficiencies being quite common.

Subsequently the mould maker must take undercuts and various other mould-specific and mould injection technical parameters into consideration to find the most convenient design for splitting or parting as regards the movable and the fixed mould half.

Once a suitable splitting/parting has been achieved, the mould maker begins to plan and design the movable parts of the mould, such as sliders, and to plan bores for cooling channels as well as ejectors.

The forming of bores for cooling channels in each mould half must be carefully considered in order to achieve adequate cooling which is adapted to the product mould in question. The forming of bores for ejectors must also be carefully considered in order to provide ejection which is both gentle and efficient. Moreover, it must also be ensured that ejectors and cooling channels do not collide with each other, preferably while at the same time cooling or ejection must not be deteriorated.

When the mould has been planned and designed, the mould maker produces data for machining of the two mould halves. The data is usually ordinary two-dimensional construction drawings and data for NC machines. Then the machining of the two mould halves as well as mounting and fitting thereof take place.

SUMMARY OF THE INVENTION

An object of the present invention is to reduce the time it takes to make a mould from the point of time when a pattern of an intended product is received until the point of time when a completed mould can be presented.

This object is achieved by a method for making an injection mould according to claims 1, 8 and 11 as well as an injection mould according to claim 5. Preferred embodiments are stated in the dependent claims.

According to the invention, the method for making injection moulds comprises the steps of receiving a product pattern, defining function holes and function recesses, and defining, separate from and parallel to the construction of function holes and function recesses, a product cavity and a parting plane of the mould.

By carrying out the defining of function holes and function recesses separate from and parallel to the defining of the product cavity and parting plane of the mould it is possible to save time since both the defining of function holes or function recesses and the defining of the product cavity are steps in the production process which take long. A further advantage of this mode of procedure is that the defining of function holes and function recesses can be begun as soon as a product pattern has been obtained even if the obtained pattern is not of such quality as to allow it to be used without adjustments and changes for the defining of the product cavity and the parting plane of the mould. In such a case, the defining of the product cavity and the parting plane of the mould must be preceded by the product pattern being "mended" whereas the defining of function holes and function recesses can be carried out completely without the product pattern being "mended".

According to a preferred embodiment, all function holes and function recesses in a first pattern of the mould are defined while the product cavity is defined in a second pattern of the same mould. In this way, the work with the defining of function holes and function recesses can take place completely separate from the work with the defining of the product cavity and the parting plane of the mould.

According to a preferred embodiment, defining of function holes and function recesses comprises defining of cooling channels, holes for ejectors, grooves for driving of sliders etc.

Preferably, the mould patterns are digital patterns which can be changed and/or adjusted by means of a CAD program, Construction Aided Design. The step of defining, in connection with these patterns, function holes, function recesses, product cavity and mould parting plane can thus comprise designing of the pattern in question in a manner that is known to those skilled in the art.

According to the preferred embodiment, a coordinate system of the product pattern is defined before it is placed in one of the first and the second mould pattern. Preferably, the origin of said coordinate system is placed essentially in the centre of the product pattern. The advantage of defining this coordinate system of the product pattern is that it will be easy to place the product pattern in the respective mould pattern in a position corresponding to one and the same position in the completed mould. Thus, machining of the mould can be effected on the basis of data originating from the separate mould patterns without the use of two separate mould patterns causing difficulties in the positioning of components defined in the separate patterns.

Moreover, according to the preferred embodiment, the method comprises the steps of generating data regarding function holes and function recesses from the first mould pattern for machining of the intended injection mould, generating data regarding the product cavity and the parting plane of the mould from the second mould pattern for machining of the intended injection mould, machining a blank for the intended injection mould by means of said data regarding function holes and function recesses independently of the data generated from the second mould pattern, and machining a blank for the intended injection mould by means of said data regarding the product cavity and the parting plane of the mould independently of the data generated from the first mould pattern.

Thus, machining of the blank for the intended injection mould can be begun as soon as one of the defining processes has generated a sufficient amount of data to enable machining, which means that additional time can be saved.

According to the preferred embodiment, the injection mould comprises a plurality of modules. Preferably, the injection mould comprises at least five modules which are aligned with each other. The five modules are:

a first mould module and a second mould module for forming a product cavity, a drive module for driving of sliders, an engaging module adapted, by application of a force, to prevent dividing between the first and the second mould module when introducing product material into the product cavity, and an ejector module for ejecting a completed product from one of the first and the second mould module.

By dividing the injection mould into several modules as stated above, the machining time for the mould can be reduced further. The reduced machining time is a result of the possibility of machining several modules in the mould simultaneously. It is even possible to machine all modules simultaneously and, since essentially all modules have a special function that is not designed in the same way in all modules, the module construction implies that machining that was previously necessarily carried out sequentially can now be carried out in parallel. For instance, a cooling channel in a module can be machined, while at the same recesses for driving of sliders can be machined in another module while at the same time guiding recesses for ejector pins are machined in another module, etc. Furthermore, the module construction makes it possible to easily and rapidly replace a damaged cavity since only the mould module has to be made again and all the data for machining is already available. The advantage of merely replacing a mould module with a new mould module is also applicable to products where the form is changed without affecting the location of ejectors and sliders. In such a case, all the other modules can be retained while new mould modules are made.

According to the preferred embodiment of the invention, a cooling channel is produced by removing material from the surface of a module until the cooling channel forms a continuous groove in the module. In operation, the groove is covered by an adjoining module, thus producing a channel for coolant. The advantage of making cooling channels in this way is that it is a quick operation and that the cooling channel can be given largely any form and extent.

Moreover, according to the preferred embodiment of the invention, the drive module comprises recesses for wheels and shafts for driving of sliders. Further the drive module has grooves intended to accommodate means connecting the wheel of a slider to a wheel for transmitting the motion. Said wheel is preferably a gear wheel, but can also be different kinds of belt drive wheels, and said means for connecting is preferably a chain, but can also be a drive belt of some kind or a plurality of gear wheels, intermediate gear wheels, which by directly engaging each other transfer force to sliders.

Preferably, the present injection mould is designed for injection moulding of three-dimensional products.

The order of the steps in the claims does not define an order of priority if this is not clearly indicated.

BRIEF DESCRIPTION OF THE DRAWINGS

The invention will now be described in more detail by way of example and with reference to the accompanying drawings.

FIGS. 9a–9d illustrate a flow chart for making an injection mould according to a preferred embodiment of the invention.

DESCRIPTION OF A PREFERRED EMBODIMENT

Figure 1:
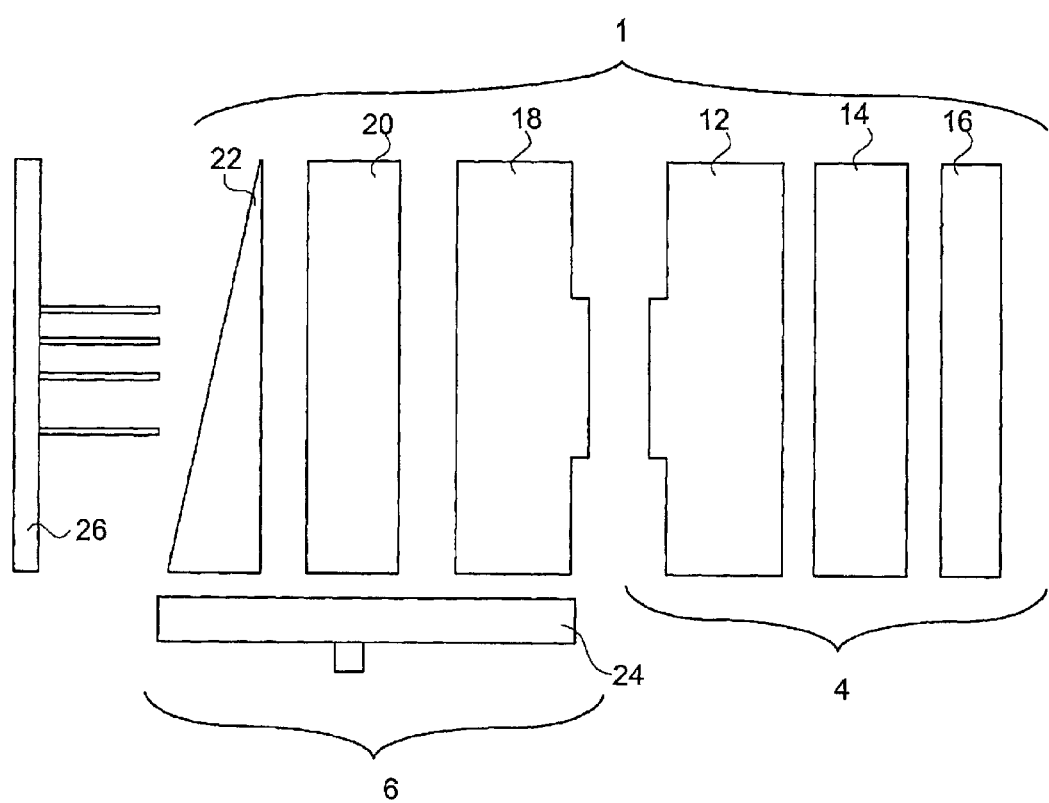
FIG. 1 illustrates schematically the module construction of the injection mould according to an embodiment of the invention.

FIG. 1 shows an injection mould made up of modules according to the invention. The injection mould 1 can, like prior-art injection moulds, be divided into a first and a second mould half 4, 6, which first mould half 4 is fixed (fixed mould half) while the second mould half 6 is movable (movable mould half) in relation to the first mould half 4. The first mould half 4 preferably comprises a first mould module 12, a drive module 14 and a distributing module 16. The second mould half 6 preferably comprises a second mould module 18, an ejector module 20, an engaging module 22 and a guide module 24. When making the injection mould 1, the modules 12–24 of the respective mould halves 4, 6 are assembled to form the two mould halves 4, 6 of the injection mould 1. In addition to these modules 12–24, which constitute the actual injection mould, a push module 26 is arranged in the injection moulding machine for actuating ejectors arranged in the ejector module 20 when the product is removed from the injection mould 1.

Figure 2A:
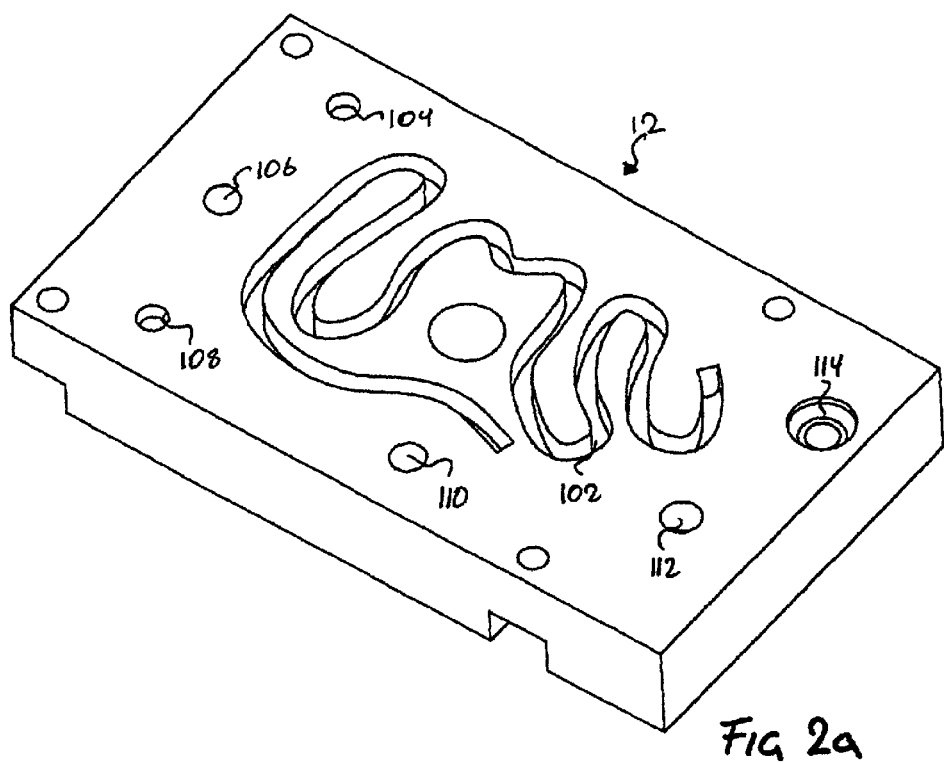
FIG. 2a is a perspective view from a first side of the first mould module in FIG. 1.
Figure 2B:
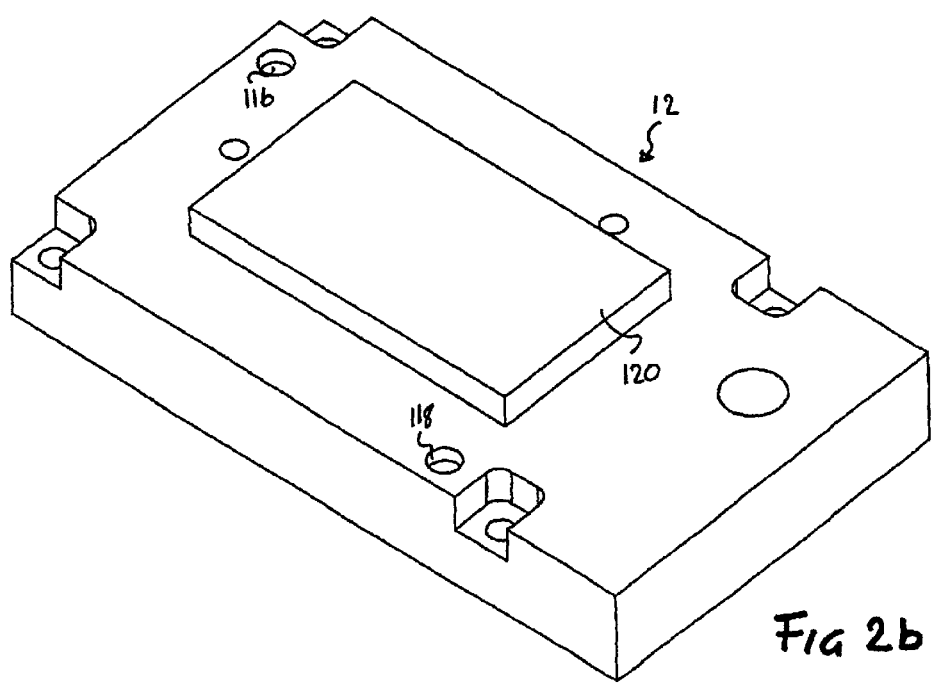
FIG. 2b is a perspective view from a second side of the first mould module in FIG. 1, when machined according to data obtained from a process for defining function holes and function recesses.
Figure 2C:
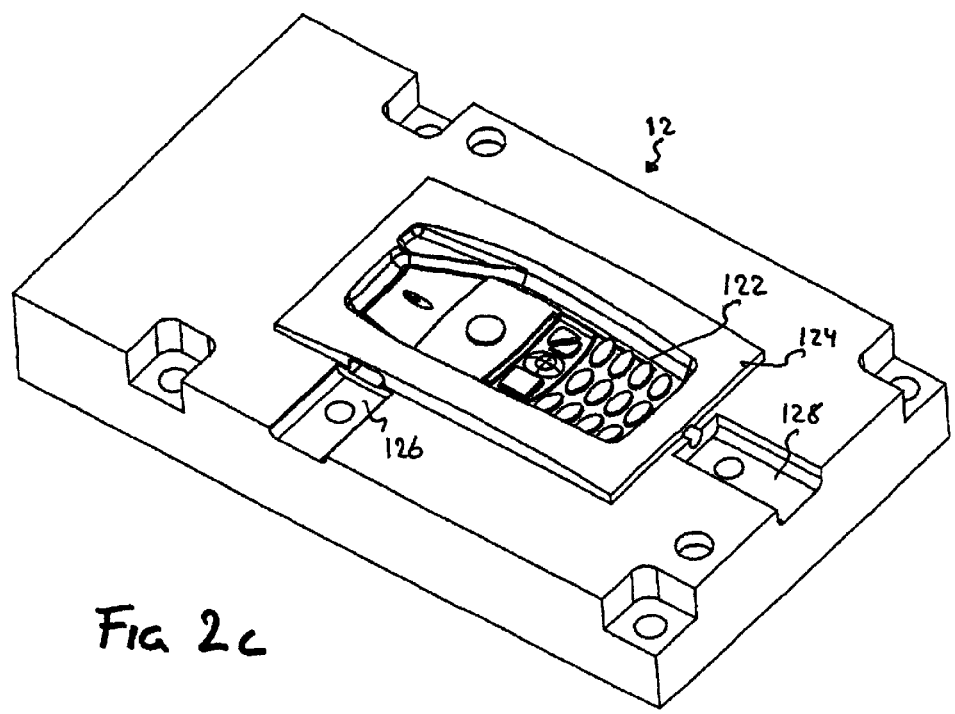
FIG. 2c is a perspective view from the second side of the first mould module in FIG. 2b, when machined according to data obtained from a process for defining product cavity and parting plane.

FIGS. 2a–2c are different views of the first mould module 12. The first mould module 12 comprises a cooling groove 102 and various recesses 104–114 for mounting and inserting shafts of a slider driving arrangement which essentially is arranged in the drive module 14, see FIG. 3a. Besides, the first mould module comprises guide means 116, 118, an area 120 for forming a product cavity 122 and a parting plane 124 as well as recesses 126, 128 for sliders, see FIGS. 2b and 2c.

The guide means 116, 118 between the mould modules 12, 18 consist of a pin, which is arranged in one of the mould modules 12, 18, and a hole which is arranged in the other mould module. Preferably the pin is a rod which extends through all the modules in the mould half 4, 6 in question to ensure the correct positioning of the modules relative to each other. The rod is somewhat longer than the length of the mould half in the direction of insertion of the rod. Also in the other mould half, the correct positioning is ensured by means of a rod. This rod, however, is somewhat shorter than the length of the mould half in the direction of insertion of the rod. The smaller length of the rod causes a hole in the mould module of the mould half in question.

The appearance and location of the above-mentioned components vary according to the form and appearance of the product for which the mould is made. For instance, the number of sliders could be smaller or greater if the completed product is formed with a smaller or greater number of holes for which sliders must be used.

Figure 3A:
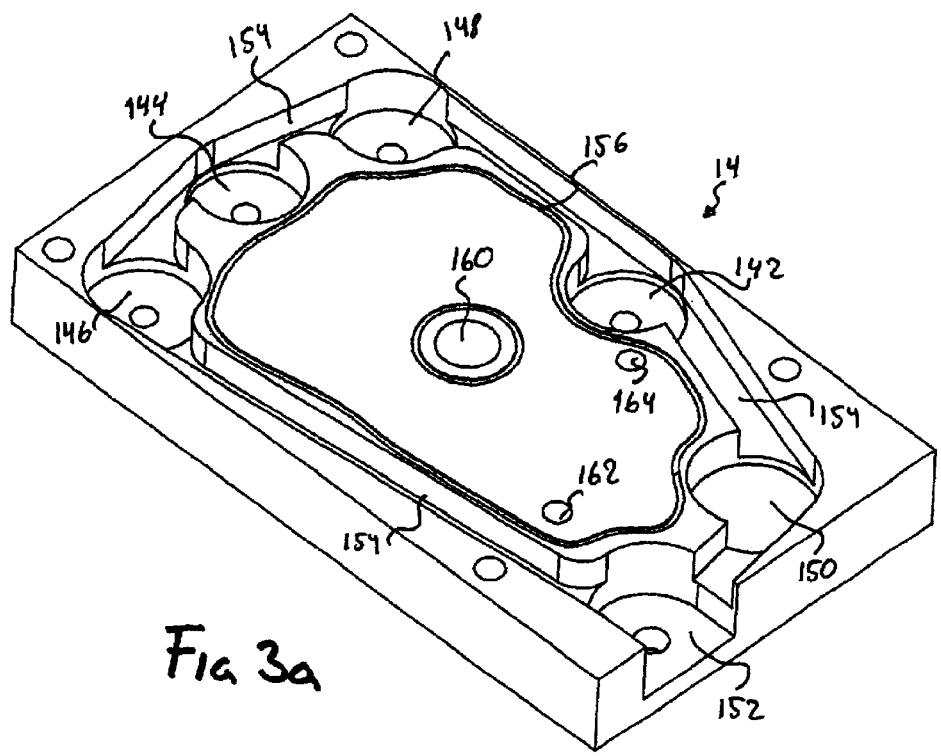
FIG. 3a is a perspective view from a first side of the drive module in FIG. 1.
Figure 3B:
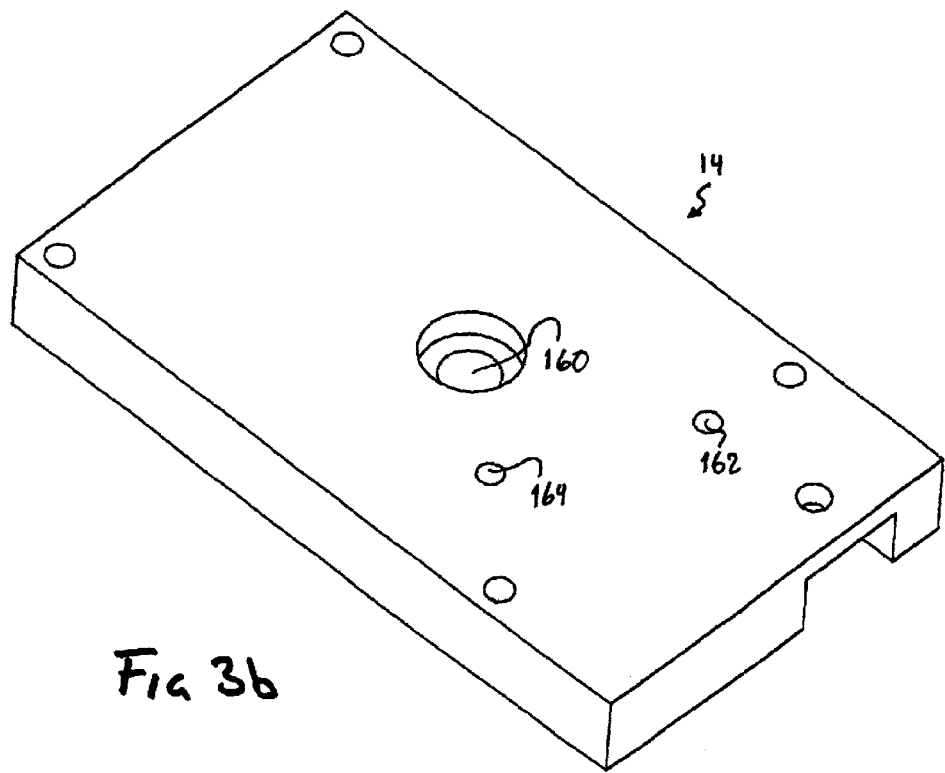
FIG. 3b is a perspective view from a second side of the drive module in FIG. 1.

FIGS. 3a–b show two views of the drive module 14. A first side, see FIG. 3a, of the drive module 14 comprises recesses 142, 144 for driving of sliders, recesses 146,148, 150 for free wheels, recesses 152 for external power transmission, recesses 154 for internal power transmission, for instance a chain, grooves 156, 158 for sealing against the first mould module 12, a recess 160 for receiving a hot-runner inlet for conveying injection moulding material and inlets and outlets 162, 164 for coolant.

A second side, see FIG. 3b, comprises corresponding recesses 160 for the hot-runner inlet and inlets and outlets 162, 164 for coolant. Preferably use is made of gear wheels for the driving of sliders, as free wheels and for external power transmission. A rubber packing is preferably arranged in the grooves 156, 158.

The first side of the drive module 14 adjoins the cooling groove 102 of the first mould module 12 when the modules are mounted adjacent to each other, which means that the area between the sealing grooves 156 and 158, together with the cooling groove 152, defines a cooling channel.

Figure 4:
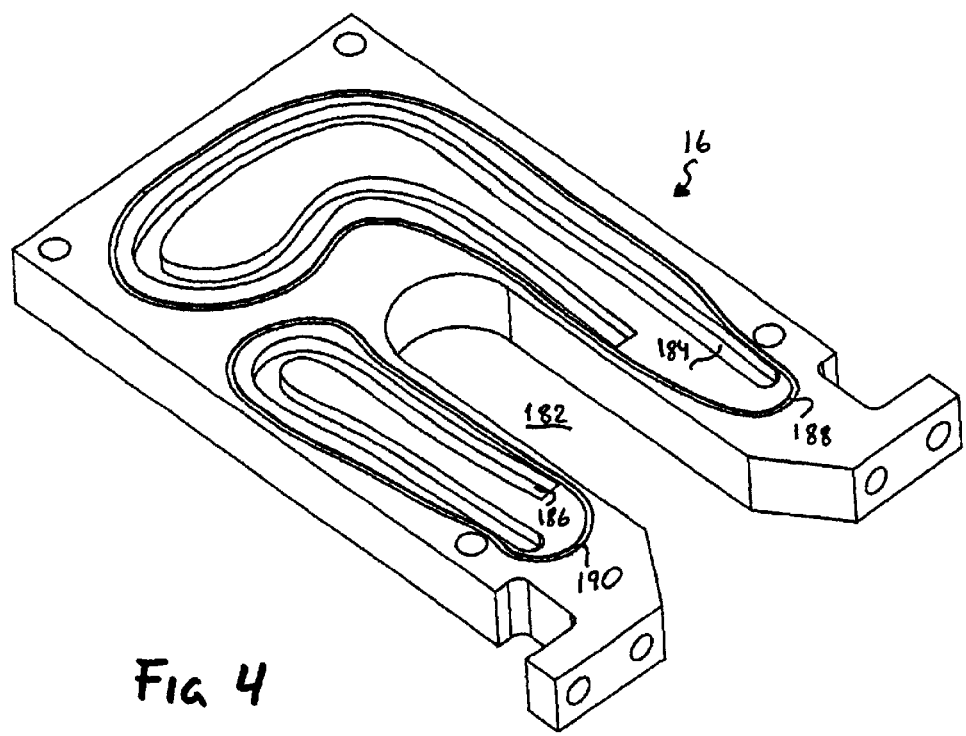
FIG. 4 is a perspective view from a first side of the distributing module in FIG. 1.

FIG. 4 shows the distributing module 16. The distributing module 16 comprises a recess 182 for inserting the hot-runner inlet into the injection mould, which hot-runner inlet conveys injection moulding material, two cooling grooves 184, 186 and sealing grooves 188, 190. The side of the distributing module on which the cooling grooves 184, 186 are arranged adjoins the other side of the drive module 14, which means that a cooling channel is defined by the cooling grooves 184, 186 and the second side of the drive module.

Figure 5A:
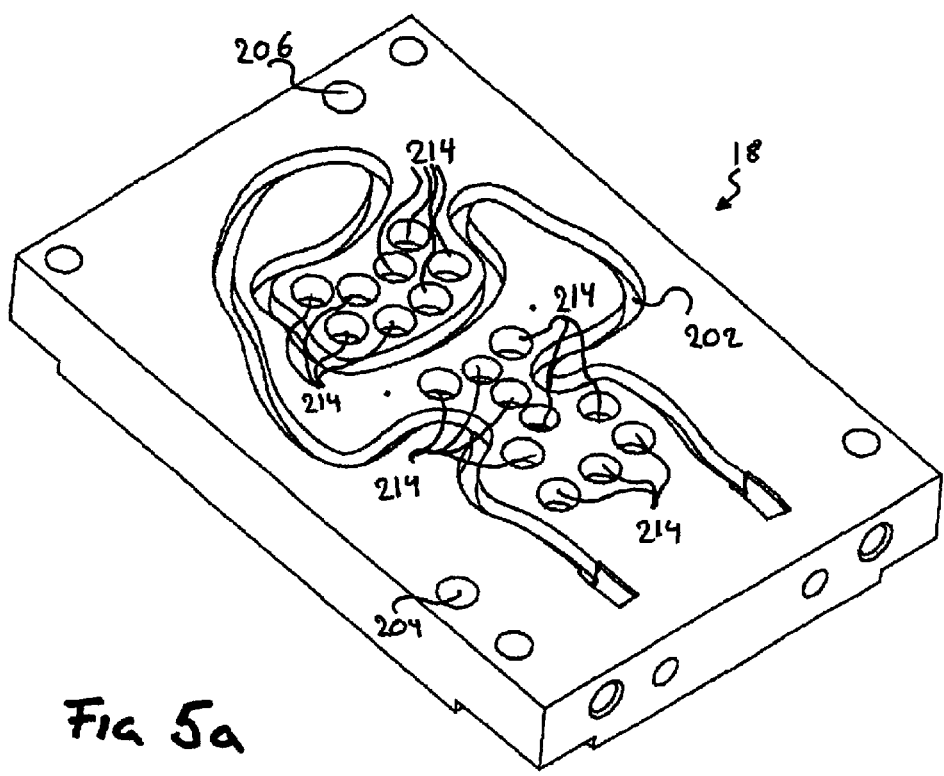
FIG. 5a is a perspective view from a first side of the second mould module in FIG. 1.
Figure 5B:
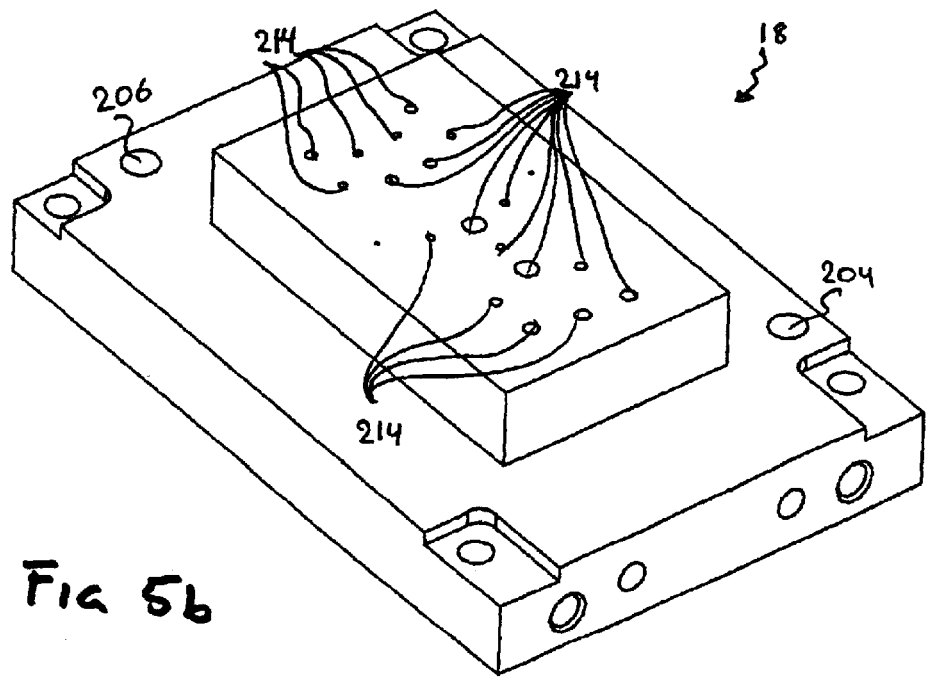
FIG. 5b is a perspective view from a second side of the second mould module in FIG. 1, when machined according to data obtained from a process for defining function holes and function recesses.
Figure 5C:
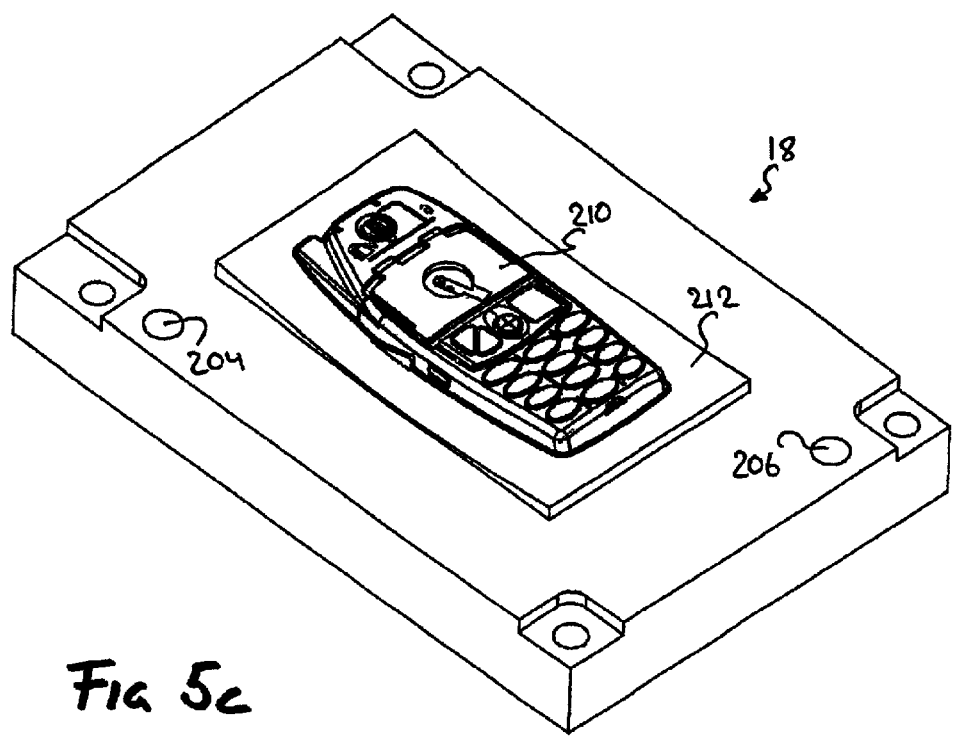
FIG. 5c is a perspective view from the second side of the second mould module in FIG. 2b, when machined according to data obtained from a process for defining product cavity and parting plane.

FIGS. 5a–5c show different views of the second mould module 14. Like the first mould module 12, the second module 18 comprises a cooling groove 202, guide means 204, 206, an area 208 for forming a product cavity 210 and a parting plane 212. Moreover the second mould module comprises ejector holes 214 whose function is to accommodate a front portion of ejectors, i.e. the part of each ejector which is not accommodated in the second mould module 18 is accommodated in the ejector module 20, for ejecting a completed product from the mould module 18 and for sealing the ejector holes 214 during the actual injection moulding of the product.

Figure 6:
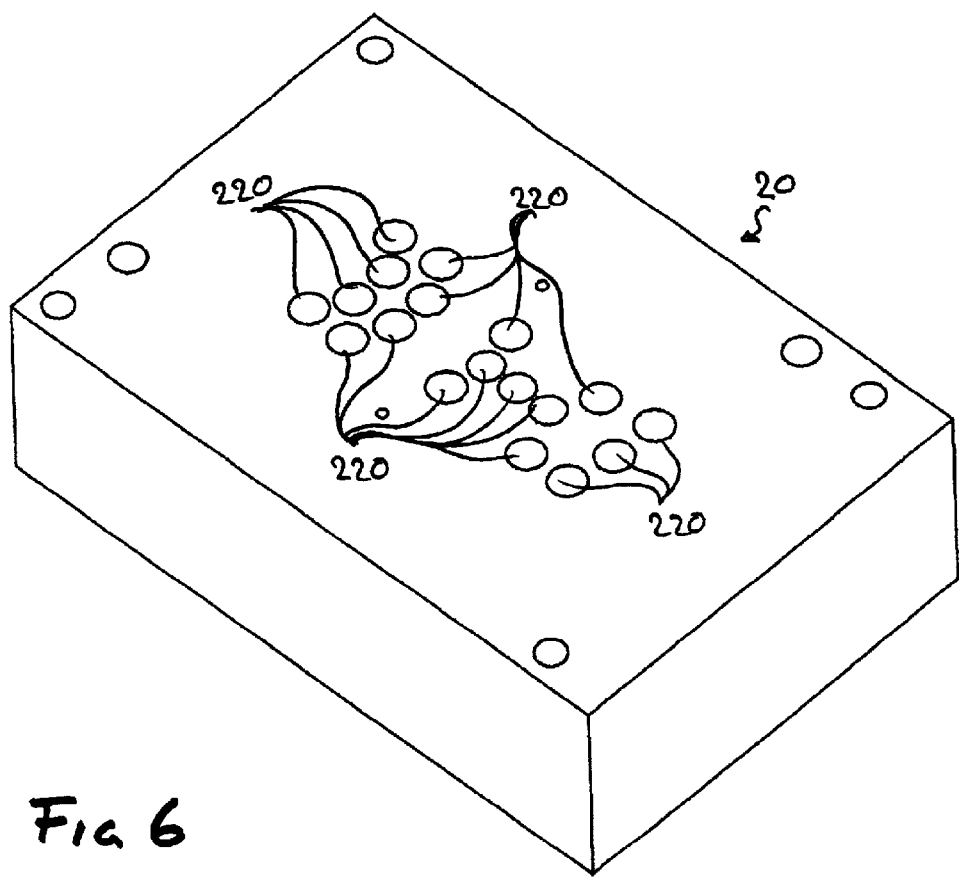
FIG. 6 is a perspective view from the first side of the ejector module in FIG. 1.

FIG. 6 illustrates the ejector module 20, which comprises holes 220 which are arranged to accommodate ejectors. A force is applied to the ejectors by applicators during ejection of the completed product, said applicators being arranged in the applicator module 26 which is not assembled with the first or the second mould half 4, 6 shown in FIG. 1.

Figure 7:
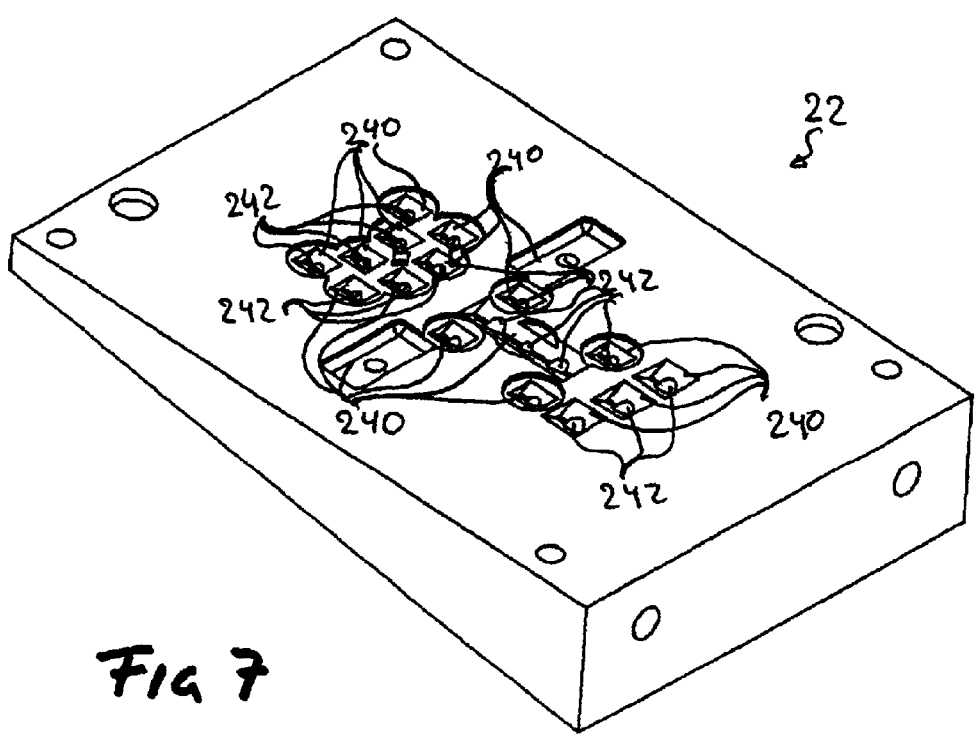
FIG. 7 is a perspective view from a first side of the engaging module in FIG. 1.

FIG. 7 illustrates the engaging module 22 which comprises recesses 240 which are arranged to ensure that ejectors do not rotate round their own longitudinal axis. It is important for this not to take place since the ejectors seal the product cavity 210 and therefore are designed to be part of the surface in the product cavity 210. The engaging module also comprises applicator holes 242 through which the applicators are inserted into the second mould half for applying a force to the ejectors. The main purpose of the engaging module is to prevent, by application of a force, parting between the first and the second mould module 12, 18 when introducing product material into the product cavity, which consists of the cavities 122, 210 of the respective mould modules. This is achieved by an outer locking means engaging the engaging module 22 for locking the second mould module 18 against the first mould module 12 and for absorbing the forces which act to separate the first and the second mould module 12, 18 from each other during the injection moulding process. Preferably the engaging module is wedge-shaped.

Figure 8:
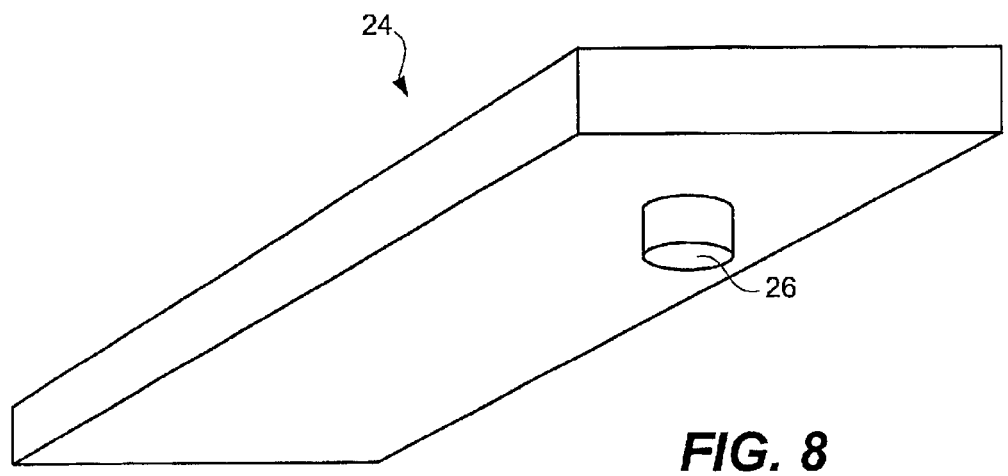
FIG. 8 is a perspective view from a first side of the guide module in FIG. 1.

FIG. 8 shows the guide module 24. The guide module is arranged to support the other modules in the second mould half 6 and ensure that this moves in a suitable fashion in relation to the first mould half 4. For instance, it ensures that the second mould half 6 is moved towards the first mould half 4 to form the product cavity which consists of the cavities 122, 210 of the first and the second mould module 12, 18 when these mould modules 12, 18 engage each other.

To perform this motion, a guide pin 260 is arranged on the guide module 24 and is arranged to run in a groove in the injection moulding machine. Said groove has preferably the form of two essentially sinusoidal grooves arranged in connection with each other, one groove immediately following the other. Preferably, the form of each groove essentially corresponds to a half-cycle.

Figure 9B:
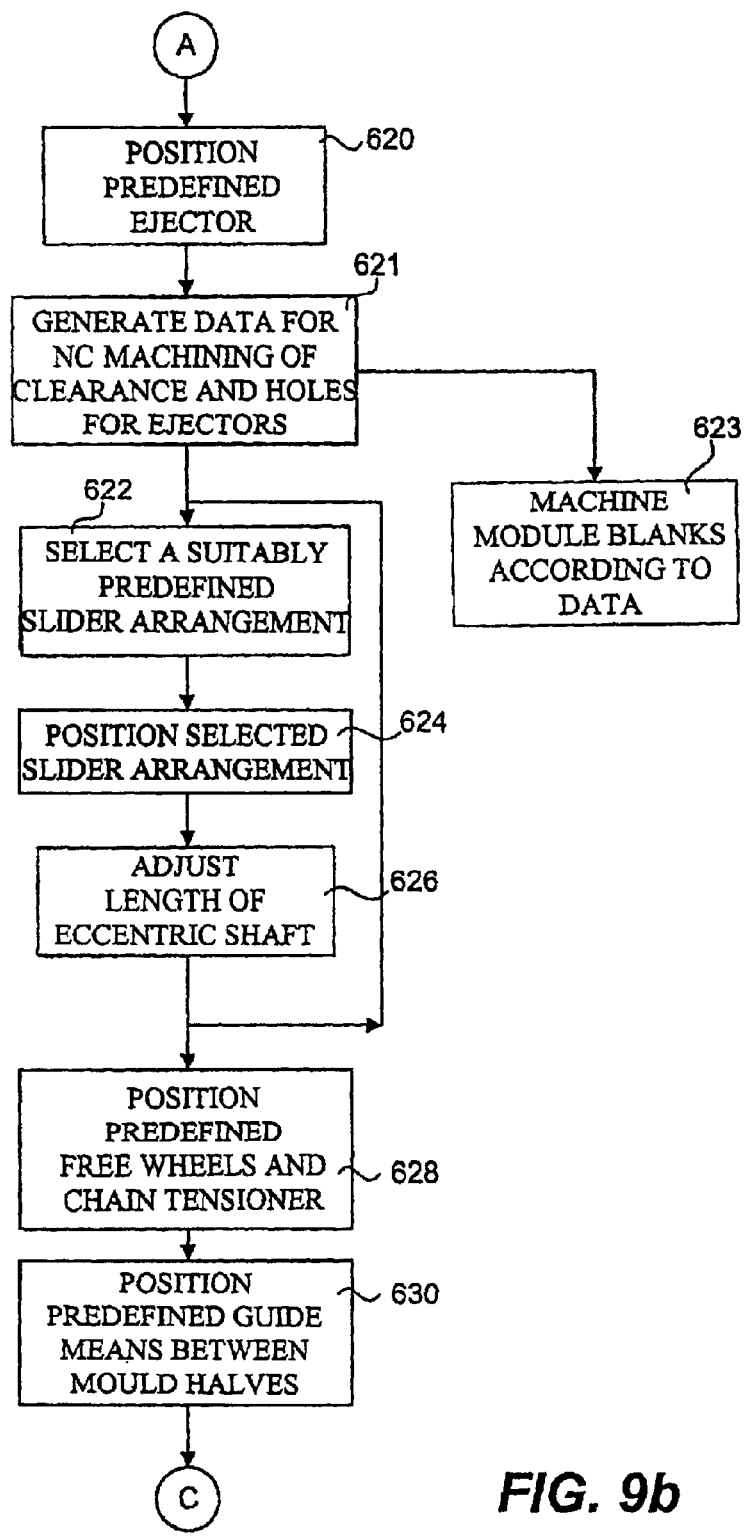
Figure 9C:
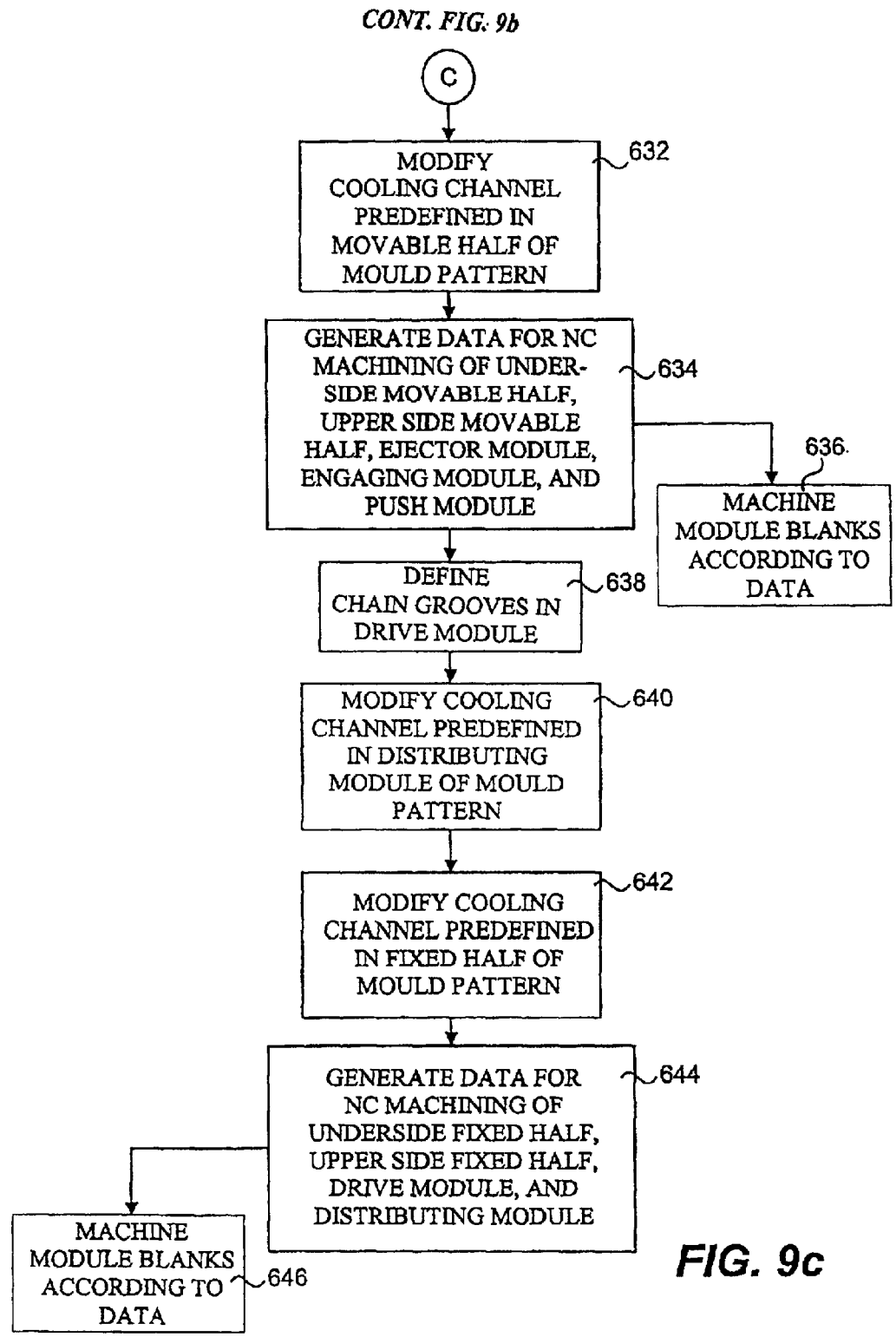
Figure 9D:
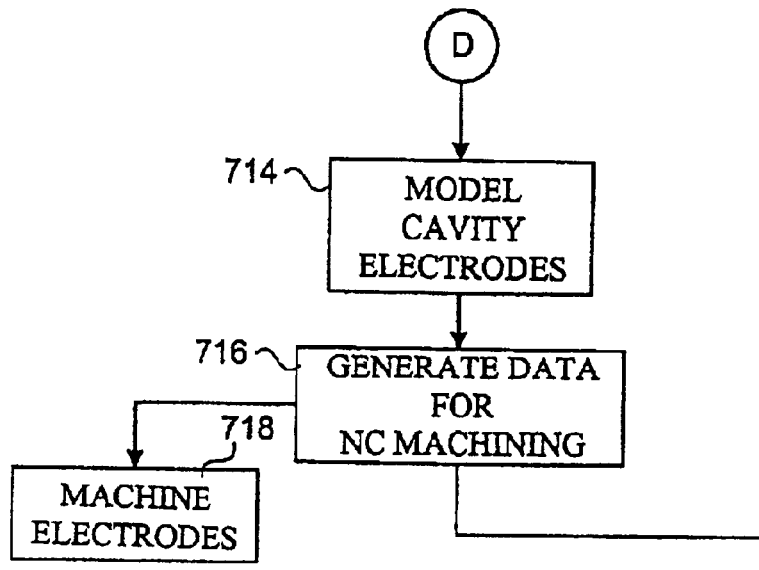
Figure 9D:
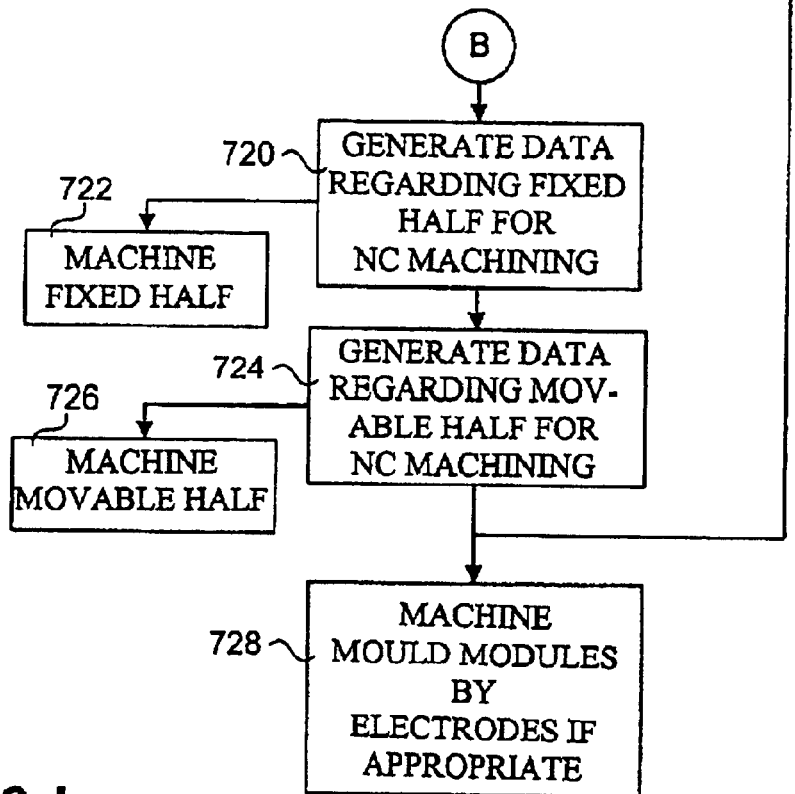

FIGS. 9a–9b illustrate a flow chart for making an injection mould according to the invention. The process is initiated by a three-dimensional digital pattern being loaded, step 502, into a computer in which a CAD program can be run, for instance a PC, a workstation, etc. The pattern is preferably a three-dimensional pattern intended for CAD programs. Then coordinate systems are placed in the product pattern, step 504. A main coordinate system for the product is placed somewhere in the product pattern, preferably as centrally as possible. This coordinate system is set for the product to be placed in various mould patterns, without resulting in positional differences in machining of mould blanks from separate mould patterns. Besides, coordinate systems are placed where holes in the product must be formed by means of sliders. Further a point for connecting the hot-runner inlet is positioned; if the product is a front piece for a mobile phone this point is preferably positioned centrally in the opening where a display is to be shown.

The product pattern that has been provided with suitable coordinate systems is now handed over to a process for defining function holes and function recesses and to a process for defining a product cavity and the parting plane of the mould. The process for defining function holes and function recesses as well as the process for defining a product cavity and the parting plane of the mould are carried out separately from each other, in separate mould patterns, and in parallel. For instance, the processes are carried out in two different computers and simultaneously. First the process for defining function holes and function recesses will be described, and then the process for defining a product cavity and the parting plane of the mould will be described.

In the process for defining function holes and function recesses, the product pattern provided with coordinate systems is inserted into a first mould pattern, step 602. The main coordinate system of the product pattern allows the product pattern to be placed automatically in the correct position in the mould pattern. The mould pattern is especially adapted to this process.

Subsequently the clearance cutting is modified, step 604, which means that the size of the area for forming a product cavity is determined. Among other things, the size of the top face of the area is to be optimised so that the mould modules can easily be brought together and seal the product cavity while at the same time sufficient bearing capacity round the product cavity is achieved.

Predefined inlets are then placed in the mould pattern, step 608. These inlets define the points where the injection moulding material is fed into the product cavity. In a preferred embodiment, the user indicates on the display of the computer that he wants to position inlets, whereupon predefined inlets are shown in a menu from which the inlets can be dragged and dropped in the desired position. This can also be solved using predefined symbols and a library of symbols.

When the inlets have been positioned, a docking point for the hot-runner inlet is placed on the previously defined hot-runner inlet point, step 610. In a preferred embodiment, the user indicates on the display of the computer that he wants to position the docking point, after which the user will be able to drag and drop the docking point at the hot-runner inlet point. After that a measure of the length of the hot-runner inlet is generated, step 612. The measure of the length of the hot-runner inlet is forwarded for machining, step 614. In this case machining means that the hot-runner inlet is cut to the indicated length.

When the data for cutting of the hot-runner inlet has been delivered, the process continues by inclined ejectors being positioned and their geometry being determined, step 616. In a preferred embodiment, the user chooses to carry out the step by indicating this on the display. Then a received point is centred over the area where the inclined ejector is to be placed. The size, angle and profile of the inclined ejector will be determined. The profile relates to the appearance of that part of the inclined ejector which is to engage the completed product during ejection and is conveniently adapted to the surface with which the inclined ejector engages. When the inclined ejector is defined, data regarding the geometry of the inclined ejector is outputted for wire EDM, step 618. When the geometry of the inclined ejector has been supplied for wire EDM, the process continues by ejectors being positioned, step 620. Once more the user chooses to carry out the step by indicating it on the display. As a result of the choice, a menu is presented, which contains a great number of predefined ejectors of varying size, for instance, the diameter of the ejector can vary. Now the user only needs to drag and drop the desired ejectors in the desired positions. The drag and drop procedure and the predefined ejectors make it possible to define the ejectors in the mould pattern by simple two-dimensional considerations, i.e. no three-dimensional considerations are required.

When the ejectors have been positioned, preferably data for NC machining of clearance and ejector holes is generated, step 621. This data is transferred to appropriate machines where the modules for which said data is intended can be machined each separately and simultaneously, step 623. This generation of data can also be saved for step 634, if desired.

When a suitable number of ejectors have been positioned, a suitably predefined slider arrangement is selected, step 622. Each slider arrangement comprises at least one slider blank, whose one end will later define the hole that is to be formed by the slider, an eccentric shaft for driving the slider essentially perpendicular to the longitudinal direction of the shaft, and a power transmission wheel which according to a special embodiment is a gear wheel. The selected slider arrangement is loaded into and placed in a convenient position in the mould pattern, step 624. Preferably use is made of the coordinate systems for the sliders predefined in the product pattern, which means that the slider arrangement need only be attached to said coordinate systems to be correctly positioned. Then the length of the eccentric shaft is adjusted to the dimensions in the current mould pattern, step 626. The steps 622–626 are repeated for the number of slider arrangements that are necessary for the product in question.

When the slider arrangements have been positioned, predefined free wheels and chain tensioners are positioned, step 628. According to a preferred embodiment, the user chooses to initiate this step by indicating it on the display. When the user has chosen this alternative, a number of predefined wheels, preferably gear wheels, are presented, which the user can drag and drop on the display. The drive wheels of the slider arrangements are preferably driven by a chain, which in turn is driven by a gear which is adapted to transfer a driving motion from an external drive means, said gear preferably being a gear wheel. The purpose of the free wheels is to slack the chain so that a function space can be obtained inside the path of the chain. The purpose of the chain tensioner is to ensure that the chain is sufficiently stretched. Preferably, cavities are defined in the first mould module and in the drive module at the same time as the components are positioned.

When the driving is defined, the guide means between the first and the second mode module are to be positioned, step 630. Preferably a menu with predefined guide means, preferably pin and hole, is obtained when indicating that this step is to be carried out. The predefined guide means can be dragged from the menu and dropped in a suitable position on the mould pattern.

Subsequently a cooling channel is modified in the second mould module, step 632. In the mould pattern there is a predefined extent for the cooling channel in the form of a modifiable spline, which is a sequence of curves which forms a loop which can be adjusted by the user seizing points on the loop and moving them. The cooling channel extends between two inlets which cannot be adjusted or moved. The user adjusts the path of the cooling channel between these two inlets by moving and releasing points of the predefined cooling channel. By the cooling channel being defined by a spline, soft, rounded turns will be obtained all the time. In this manner, the extent of the cooling channel can be adjusted for maximum cooling efficiency while at the same time ejector holes and other function holes and function recesses which have been defined previously can be passed by the cooling channel at a safe distance as regards collision.

When the extent of the cooling channel is defined, data for NC machining of both sides of the second mould module, the ejector module, the engaging module and the push module is generated, all of which, apart from the push module, belong to the second mould half. This data is transferred to one or more NC machines where module blanks are machined, step 636. Preferably the possibility of saving of time is utilised, which is achieved by the module construction of the mould, implying that said data is transferred to a plurality of NC machines which machine different ones of the above-mentioned modules in parallel. To achieve saving of time, not all modules need be machined in parallel by an NC machine each, but the more modules that can be machined simultaneously, the greater the saving of time.

While the modules in the second mould half are being machined, the process continues by defining the remaining components and functions in the mould pattern for function holes and function recesses, which components and functions influence only the first mould half.

Chain grooves are defined in the drive module, step 638. This is carried out by the path of the chain being drawn, by width and depth of the chain being indicated, and by an extra space for varying the position of the chain being formed adjacent to the chain tensioner.

Then predefined cooling channels are modified in the distributing module, step 640, and in the first mould module, step 642. This takes place in the same way as for the cooling channels in the second module. The difference is that two separate cooling channels are arranged in the distributing module and that an end of each of these cooling channels defines an inlet/outlet of the cooling channel in the first mould module.

After these definitions, data is generated for NC machining of both sides of the first mould module, the drive module and the distributing module, step 644, which all belong to the first module half. This data is transferred to one or more NC machines where module blanks are machined, step 646. Like in the machining of the modules belonging to the second mould half, saving of time can here be achieved by the module construction being used for parallel machining.

While the steps 602–646 regarding function holes and function recesses are being carried out, the work with product cavity and the parting plane of the mould has been started and carried out in parallel. A product pattern which is identical with the one that was inserted into the first mould pattern, step 602, is here used. First it is checked whether the product pattern is "whole", i.e. if it can be used for defining the product cavity without adjustments, step 702. In most cases, the product pattern is not whole but must be surface-modelled, step 704. A frequent defect is that surface elements, entities, are not terminated correctly relative to each other. Such a defect makes it impossible, without correction, to carry out the mechanical machining from the defective product pattern.

As soon as the product pattern is available, certain electrodes for machining of cavities can be generated. These electrodes are of such a character that the deficiencies in the product pattern do not affect the modelling or machining thereof. Certain other electrodes are dependent on a whole product pattern, and therefore these cannot be made before surface modelling of a product pattern which has been established to be "broken", step 704, or before the pattern has been established to be "whole", step 702. Whatever the case may be, the electrodes can be designed and produced parallel with the remaining work with the mould cavity and the parting plane. Consequently, the modelling of cavity electrodes, step 714, and generating of data for NC machining, step 716, are carried out as soon as possible. Moreover, said data is transferred to one or more NC machines, where the cavity electrodes are produced, step 718.

Along with modelling and production of the electrodes and when a whole product pattern is available, this product pattern is inserted into a pattern for parting, step 706. In this pattern, the parting plane is produced, step 708. In addition, the produced parting plane is copied into the product pattern.

This new product pattern is inserted into a second mould pattern, step 712. Subsequently, data is generated for NC machining of product cavities and recesses for sliders in a first mould module, step 720. In a case where the entire cavity of the module cannot be NC machined, data for an almost completed cavity is generated in step 720. In such a case, the final machining is carried out by means of electrodes in step 728. If it is possible to NC machine the entire cavity, no electrodes are made, but the cavity is completed once it has been NC machined. When data for the NC machining is generated, said data is transferred to an NC machine for machining of the cavity, step 722. When said data for NC machining of the cavity of the first mould pattern has been completed in step 720, a corresponding generation of data for machining of the cavity in the second mould module is begun, step 724. Then said data is transferred to an NC machine for machining of the second mould module, step 726. If the product requires machining by means of electrodes, which in that case have been made in steps 714–718, the mould modules are machined by means of these electrodes as soon as the respective NC machining has been finalised, step 728. In the cases where no machining by means of electrodes is necessary, the mould modules are completed once they have been NC machined.

The above-described method for making injection moulds can be used for making injection moulds for a variety of products. Preferably, three-dimensional products, such as components for telephones, for instance mobile phones, are involved.

What is claimed is:

1. A method for making an injection mould including a first mould half and a second mould half, the method comprising the steps of receiving, in a computer based system, digital information relating to a shape of a product pattern, placing digital information relating to the shape of the product pattern into a first digital mould pattern and into a second digital mould pattern, respectively, wherein the first digital mould pattern represents both the first mould half and the second mould half and wherein the second digital mould pattern represents both the first mould half and the second mould half, defining function holes and function recesses in the first digital mould pattern, defining, separate from and parallel to the step of defining function holes and function recesses, a product cavity and, a parting plane of the mould in the second digital mould pattern; and machining said first mould half and said second mould half using said digital information in an NC machine.

2. A method as claimed in claim 1, further comprising the step of defining a coordinate system in the digital information relating to the shape of the product pattern before the steps of defining function holes and function recesses and defining the product cavity and the parting plane of the mould are carried out, the coordinate system being defined so that an origin of coordinates is available within a two-dimensional projection of the product pattern.

3. A method as claimed in claim 2, further comprising the steps of generating machining data regarding function holes and function recesses from the first digital mould pattern for machining of the injection mould, generating machining data regarding the product cavity and the parting plane of the mould from the second digital mould pattern for machining of the injection mould, machining a blank for the injection mould by means of the machining data regarding function holes and function recesses independently of the machining data generated from the second mould pattern, and machining a blank for the injection mould by means of the machining data regarding the product cavity and the parting plane of the mould independently of the machining data generated from the first mould pattern.

4. A method as claimed in claim 1, further comprising the steps of generating machining data regarding function holes and function recesses from the first digital mould pattern for machining of the injection mould, generating machining data regarding the product cavity and the parting plane of the mould from the second digital mould pattern for machining of the injection mould, machining a blank for the injection mould by means of the machining data regarding function holes and function recesses independently of the machining data generated from the second mould pattern, and machining a blank for the injection mould by means of the machining data regarding the product cavity and the parting plane of the mould independently of the machining data generated from the first mould pattern.

5. A method for making injection moulds for injection moulding of mobile phone components comprising the steps as claimed in claim 1.

* * * * *